(No Model.) 4 Sheets—Sheet 1.
L. J. CODY.
SUSPENDED CAR AND MOTOR FOR ELECTRIC RAILWAYS.
No. 415,617. Patented Nov. 19, 1889.
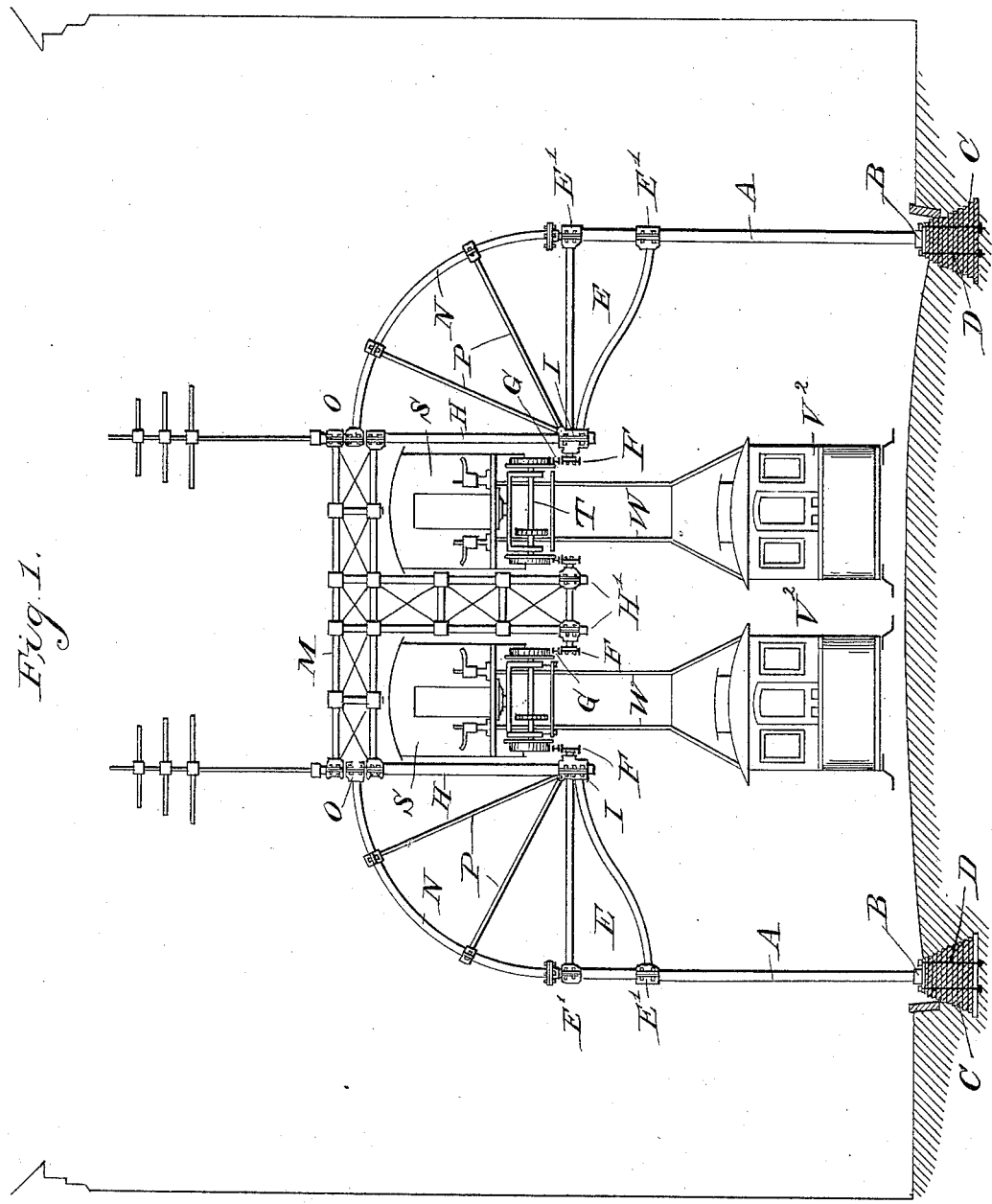

(No Model.) 4 Sheets—Sheet 2.
L. J. CODY.
SUSPENDED CAR AND MOTOR FOR ELECTRIC RAILWAYS.
No. 415,617. Patented Nov. 19, 1889.
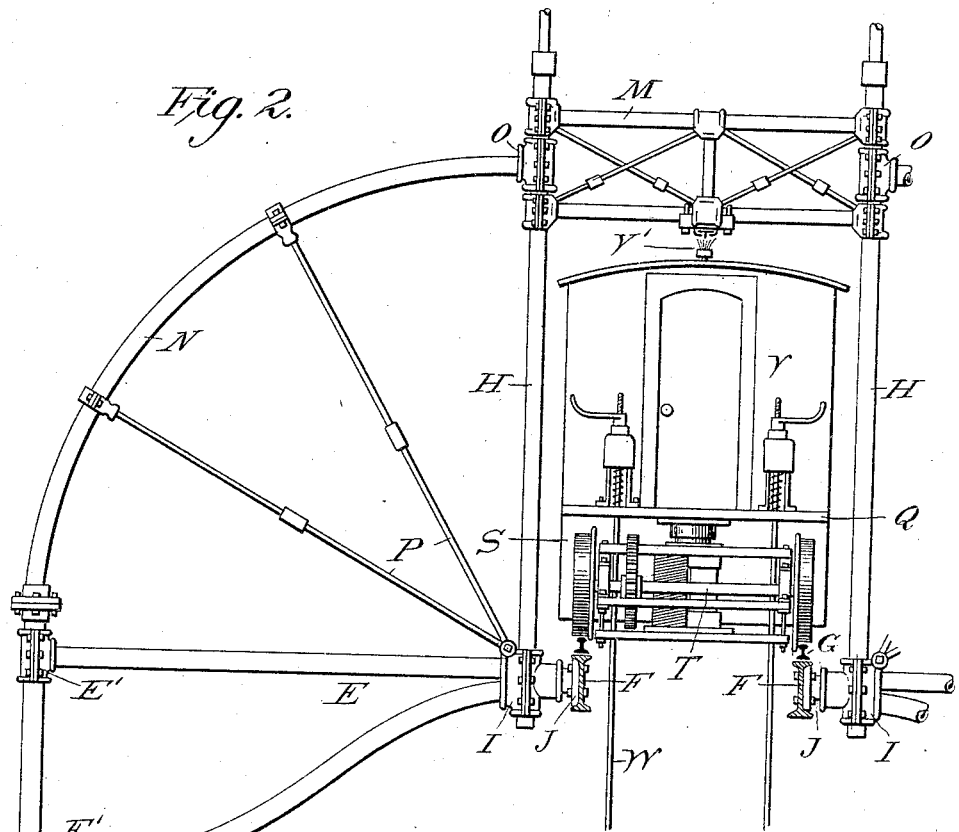
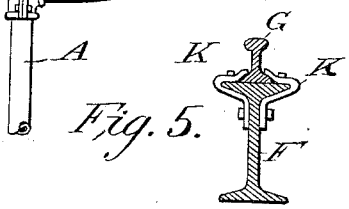
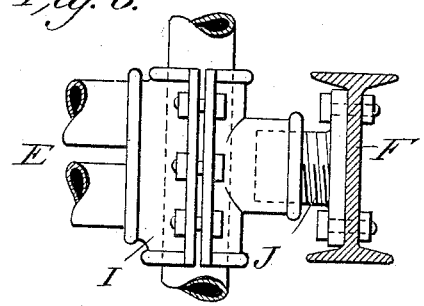
Witnesses:
Inventor:
Lorenzo J. Cody
By Thos. S. Sprague & Son
Attorneys

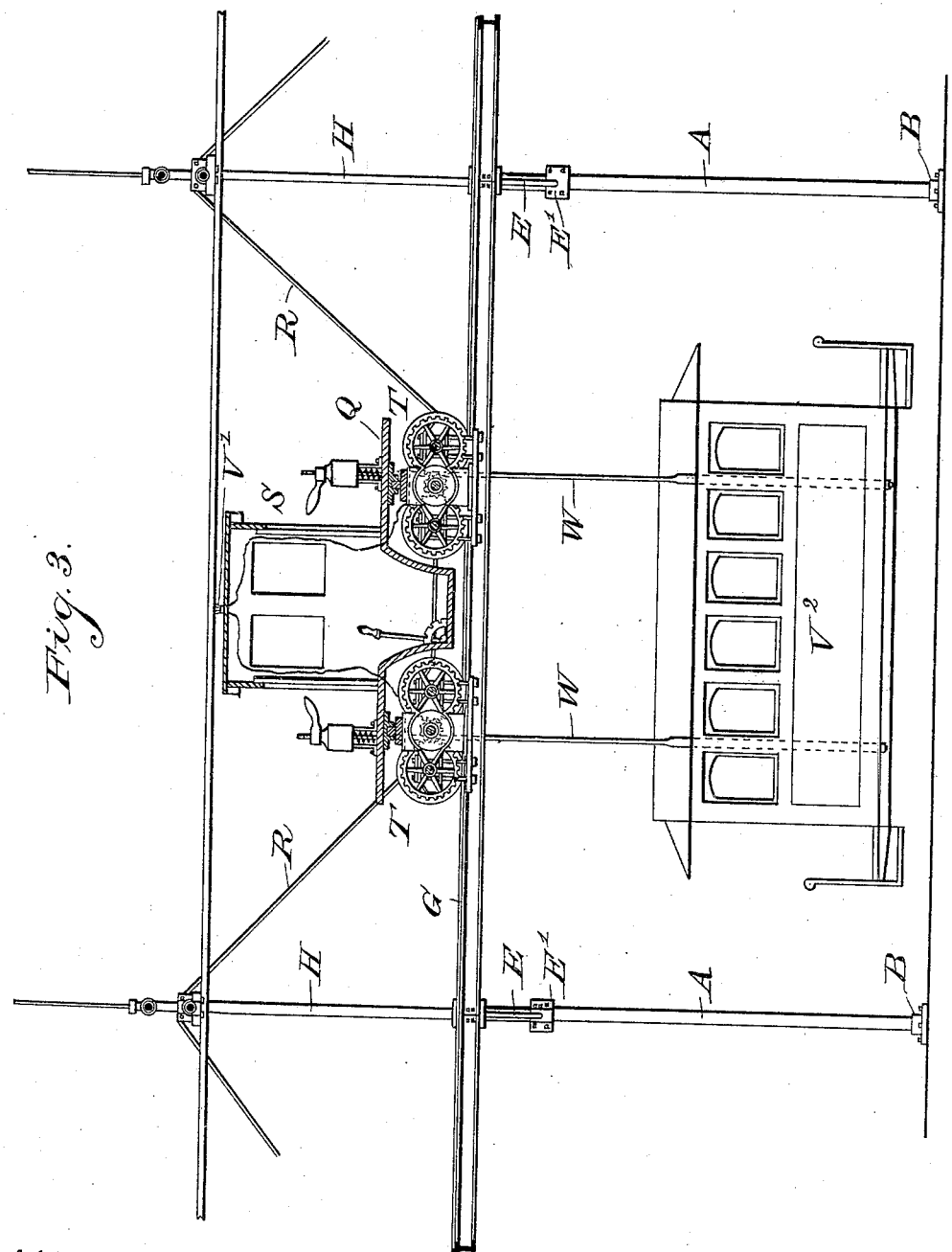

(No Model.) 4 Sheets—Sheet 4.
L. J. CODY.
SUSPENDED CAR AND MOTOR FOR ELECTRIC RAILWAYS.
No. 415,617. Patented Nov. 19, 1889.
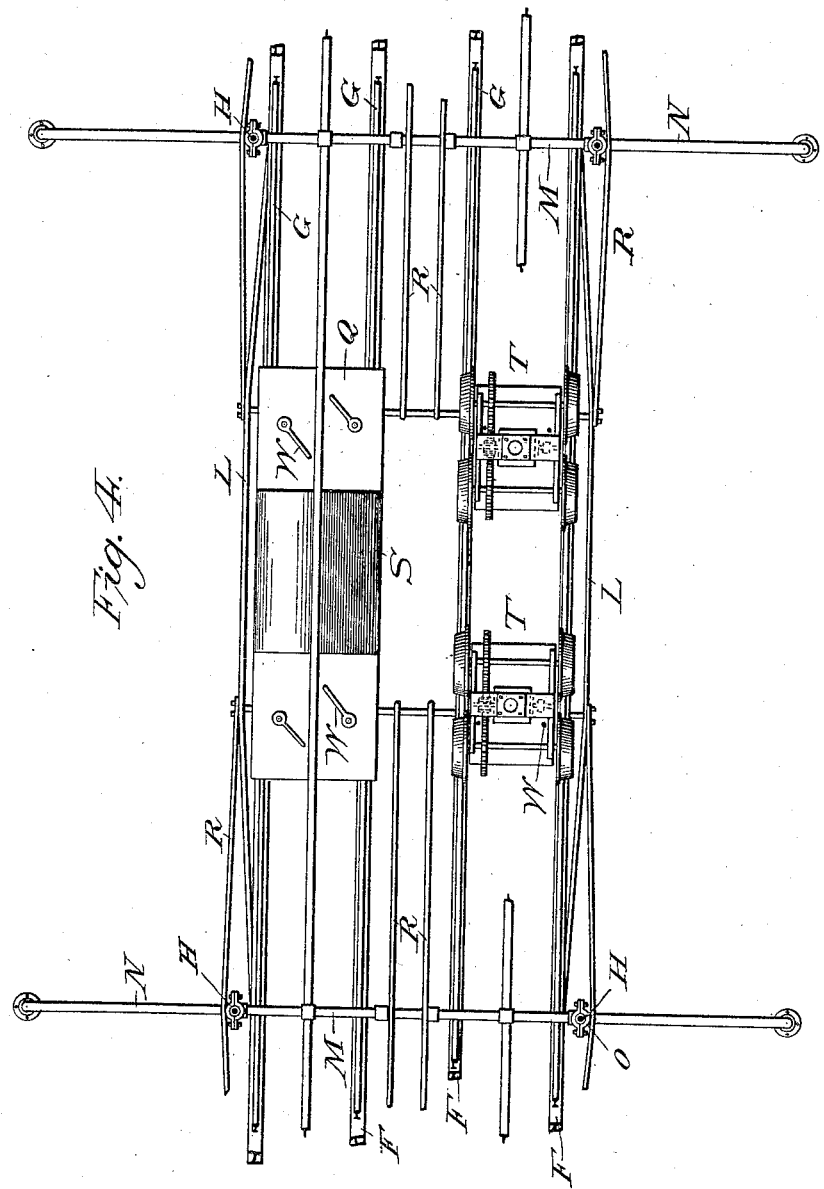
Witnesses:
Aly Scott
Jas W Graham
Inventor:
Lorenzo J Cody
By Thos S Sprague & Son
Attorneys

UNITED STATES PATENT OFFICE.

LORENZO J. CODY, OF SAULT STE. MARIE, MICHIGAN.

SUSPENDED CAR AND MOTOR FOR ELECTRIC RAILWAYS.

SPECIFICATION forming part of Letters Patent No. 415,617, dated November 19, 1889.

Application filed August 26, 1889. Serial No. 321,921. (No model.)

*To all whom it may concern:*

Be it known that I, LORENZO J. CODY, a citizen of the United States, residing at Sault Ste. Marie, in the county of Chippewa and State of Michigan, have invented certain new and useful Improvements in Suspended Cars and Motors for Electric Railways, of which the following is a specification, reference being had therein to the accompanying drawings.

This invention relates to new and useful improvements in suspended cars and motors for electric railways; and the invention consists in the novel construction and the peculiar manner of supporting and operating the cars, all as more fully hereinafter described and shown, and then definitely claimed.

In the accompanying drawings, Figure 1 is a cross-section of my car and elevated roadway with a double two-rail track. Fig. 2 is also a cross-section of my car and elevated roadway, drawn on a larger scale and constructed for a single two-rail track. Fig. 3 is a longitudinal central section through the center of the track. Fig. 4 is a plan of Fig. 1. Figs. 5 and 6 are sectional details more specifically referred to hereinafter.

The roadway is wholly constructed of iron and steel, and preferably of wrought-iron pipes; but as this feature forms the subject-matter of my application, Serial No. 298,427, filed February 2, 1889, it is unnecessary to describe it here, and I will therefore proceed to describe the subject-matter of the invention herein claimed.

Referring now to the details of the drawings, S is a propelling-carriage adapted to run upon the tracks of the railway, and consisting, preferably, of two trucks T, pivotally supporting a platform Q, and upon this platform is built a suitable cabin or pilot-house to shelter the engineer in charge of the car and the propelling devices or levers by means of which the carriage is propelled or its movement upon the rails controlled.

For electric propulsion I secure a metallic continuous T-rail to the under side of the cross-girder, projecting with its stem downward to protect it from snow and ice. This rail is suitably insulated and carries the propelling-current, which is taken off to the motors by a suitable brush or brushes V'. The carriage may be provided with one motor only or with two, one for each truck and supported by such truck. Other means—such as cable propulsion—however, may be equally well provided for propelling the carriage by means of one of the known constructions for applying the same to elevated railways.

V'' is the car, which is supported by two pairs of hangers W fore and aft from the propelling-carriage, and the upper ends of these rods rest upon springs and are screw-threaded and provided with screw-levers, by means of which the cars may be raised or lowered from or toward the ground, as contingencies may require for the free suspension of the car in suitable proximity to the roadway and to permit of raising the car to avoid obstacles, such as deep snows in winter. The hangers W are suitably braced to prevent the swaying of the car, and suitable safety-guards are secured to the trucks, to prevent the car from falling to the ground in case of accident to the propelling-carriage.

By constructing the propelling-carriage with independently-pivoted trucks less liability is incurred in spreading the tracks and greater facility is obtained to make sharp curves in the track around corners, and the increased safety, room, and convenience to the passengers from having the motor or propelling devices in a separate carriage independently housed and inaccessible to the passengers will be readily conceded.

I am aware that it is not new to suspend a car from a frame on wheels running upon rails arranged between the car and wheels, and make no claim to this feature broadly. I am not aware, however, that it has been proposed to mount the motor apparatus above the rails, where it would be out of the way of the passengers.

What I claim as new is—

1. The combination, with a two-rail elevated road-bed, of a propelling-carriage supported above the road-bed, the car suspended from said carriage, and propelling devices supported above the road-bed by said carriage, substantially as described.

2. The combination, with a two-rail elevated road-bed, of a propelling-carriage supported above the road-bed, consisting of two independently-pivoted trucks, a platform supported thereon, a pilot-house supported on said platform, and a car adjustably suspended from said platform in proximity to the roadway, substantially as described.

3. The combination, with a two-rail elevated road-bed, of a propelling-carriage consisting of independently-pivoted trucks to which the motive power is applied, arranged above the rails, a platform supported thereon and provided with a pilot-house, also above the rails, and a car adjustably suspended from the platform of said carriage, substantially as described.

4. In an elevated railway, the combination, with an elevated roadway consisting, substantially, of a two-rail track supported by two rows of posts connected by cross-girders, of an insulated T-rail supported by the cross-girders across the track and with its stem projecting downward, and an independent propelling-carriage on said track carrying the electric motors, and from which the car is suspended, substantially as described.

In testimony whereof I affix my signature, in presence of two witnesses, this 11th day of July, 1889.

LORENZO J. CODY.

Witnesses:
A. HAMILTON,
ED. MCBREARTY.